United States Patent [19]

Honda et al.

[11] Patent Number: 5,800,191
[45] Date of Patent: Sep. 1, 1998

[54] ROTARY CONNECTOR MOUNTING STRUCTURE

[75] Inventors: Yoshiro Honda; Seishi Takahashi; Hiroyuki Bannai, all of Miyagi-ken, Japan

[73] Assignee: Alps Electric Co., Ltd., Japan

[21] Appl. No.: 794,299

[22] Filed: Feb. 3, 1997

[30] Foreign Application Priority Data

Feb. 7, 1996 [JP] Japan .................................. 8-021355

[51] Int. Cl.$^6$ .................................................. H01R 35/04
[52] U.S. Cl. .................................................. 439/164; 439/15
[58] Field of Search .................................. 439/164, 15

[56] References Cited

U.S. PATENT DOCUMENTS 4,966,334  10/1990  Bannai ............................ 242/85
5,429,517   7/1995  Bolen ............................. 439/164

*Primary Examiner*—Gary F. Paumen
*Attorney, Agent, or Firm*—Brinks Hofer Gilson & Lione

[57] ABSTRACT

Disclosed is a rotary connector mounting structure which involves no rattling after the mounting to thereby achieve a reduction in noise in spite of the adoption of a snap-in system, which allows the rotary connector to be easily mounted to the steering device of an automobile. A displacement absorbing member such as an elastic member 5 or a cushion member 13 is provided on the bottom surface of a first, stationary housing 1, and a mounting member 4 of the first housing 1 is snapped in on a switch casing 10 of a combination switch, which is the stationary member of a steering device. After this, the bottom surface of the stationary housing and the mounting surface of the stator member are biased by the displacement absorbing member such that they move away from each other, whereby rattling of the stationary housing is prevented.

20 Claims, 4 Drawing Sheets

ROTARY CONNECTOR MOUNTING STRUCTURE

BACKGROUND OF THE INVENTION

1. Field of the Invention

The present invention relates to a mounting structure for a rotary connector incorporated in the steering device of an automobile and used as an electric connection means for an air bag system, a horn circuit, etc.

2. Description of the Related Art

A rotary connector is generally composed of a pair of housings connected together so as to be rotatable relative to each other and a flexible cable wound inside an annular accommodating section defined between the housings. The ends of the flexible cable, which are respectively fixed to the housings, are electrically led to the exterior. One of the housing is used as a movable member, and the other is used as a stationary member. When the movable housing is rotated in the normal or the reverse direction, the flexible cable is tightened or re-wound inside the accommodating section in accordance with the rotating direction.

The rotary connector, generally constructed as described above, is incorporated into the steering device of an automobile. The movable housing is mounted to a steering wheel having a limited number of revolutions, and the stationary housing is mounted to a stator member, such as a combination switch, whereby an electric part attached to the steering wheel, such as an air bag inflator, and an air bag driving circuit or the like attached to the stator member are electrically connected to each other through the flexible cable. In a conventionally known method for mounting this rotary connector, a plurality of mounting members extending downwards are integrally formed on the stationary housing, and claw portions of these mounting members are engaged with step portions of the stator member, whereby the stationary housing is snap-fixed to the stator member.

In the conventional snap-in type rotary connector described above, when the stationary housing is pressed against the stator member, the claw portions of the mounting members are automatically snapped in on the step portions of the stator member. Thus, when compared with the screw system, in which the fixation is effected by using a plurality of screws, the above construction is advantageous in that the stationary housing can be easily mounted. However, for the claw portions of the mounting members to be reliably snap-fixed to the step portions of the stator member, it is necessary for the claw portions to be positioned in front of the step portions with respect to the inserting direction before the bottom surface of the stationary housing abuts the stator member. As a result, after the mounting, a clearance is generated between the bottom surface of the stationary housing and the mounting surface of the stator member, so that the stationary housing is liable to rattle against the stator member, resulting in a rattling sound being generated while the automobile is running.

SUMMARY OF THE INVENTION

The present invention has been made in view of the above problem in the prior art. It is accordingly an object of the present invention to provide a rotary connector mounting structure which can prevent rattling after mounting to achieve a reduction in noise, without impairing the advantage of the snap-in type structure, which allows the rotary connector to be easily mounted to the steering device of an automobile.

In accordance with the present invention, at least one of the stationary housing and the movable housing of the rotary connector is snap-fixed to the stator member, the rotor member or the like of a steering device by utilizing the mounting members. At the same time, there is provided a displacement absorbing member for preventing the rattling of the mounting members. By providing a displacement absorbing member for preventing the rattling of the mounting members, the displacement absorbing member is deformed when the rotary connector is snap-fixed to the steering device, so that the snap-in operation can be reliably effected. Since this displacement absorbing member is elastically restored to the former state after the mounting and held in press contact with the mounting surface, it is possible to mount the rotary connector to the steering device without involving any rattling.

In accordance with the present invention, there is provided a rotary connector mounting structure comprising: a stationary housing, a movable housing rotatably connected to the stationary housing, and a flexible cable wound inside an accommodating section defined between these housings, the stationary housing being mounted to a stator member of an automobile, the movable housing being mounted to a rotor member of the automobile, wherein there is provided a mounting member for snap-fixing at least one of the stationary housing and the movable housing to the stator member or the rotor member, and wherein there is provided a displacement absorbing member for preventing this mounting member from rattling.

The mounting member may be provided on either the rotary connector or the steering device of the automobile. For example, when the stationary housing of the rotary connector is snap-fixed to the stator member by the mounting member, the displacement absorbing member is held in press contact with the bottom surface of the stationary housing and the mounting surface of the stator member, or the displacement absorbing member can be held in press contact with the top surface of the movable housing and the mounting surface of the rotor member. When the movable housing of the rotary connector is snap-fixed to the rotor member by the mounting member, the displacement absorbing member is held in press contact with the top surface of the movable housing and the mounting surface of the rotor member.

The above-mentioned displacement absorbing member, which may be provided on either the rotary connector or the steering device of the automobile, must be capable of elastic deformation. It may preferably consist, for example, of an elastic member integrally formed on the bottom surface of the stationary housing and the top surface of the movable housing, or a cushion member attached to the bottom surface of the stationary housing and the top surface of the movable housing.

When, as described above, a displacement absorbing member is provided on the rotary connector or the steering device, the displacement absorbing member is compressed to be deformed by the bottom surface of the stationary housing and the mounting surface of the stator member when the stationary housing is snap-fixed to the stator member by utilizing the mounting member, so that it is possible for the mounting member to be reliably snapped in. The displacement absorbing member is elastically restored to the former state after the mounting to bias the bottom surface of the stationary housing and the mounting surface of the stator member such that they move away from each other, whereby it is possible to prevent the stationary housing from rattling.

DESCRIPTION OF THE PREFERRED EMBODIMENT

Figure 1:
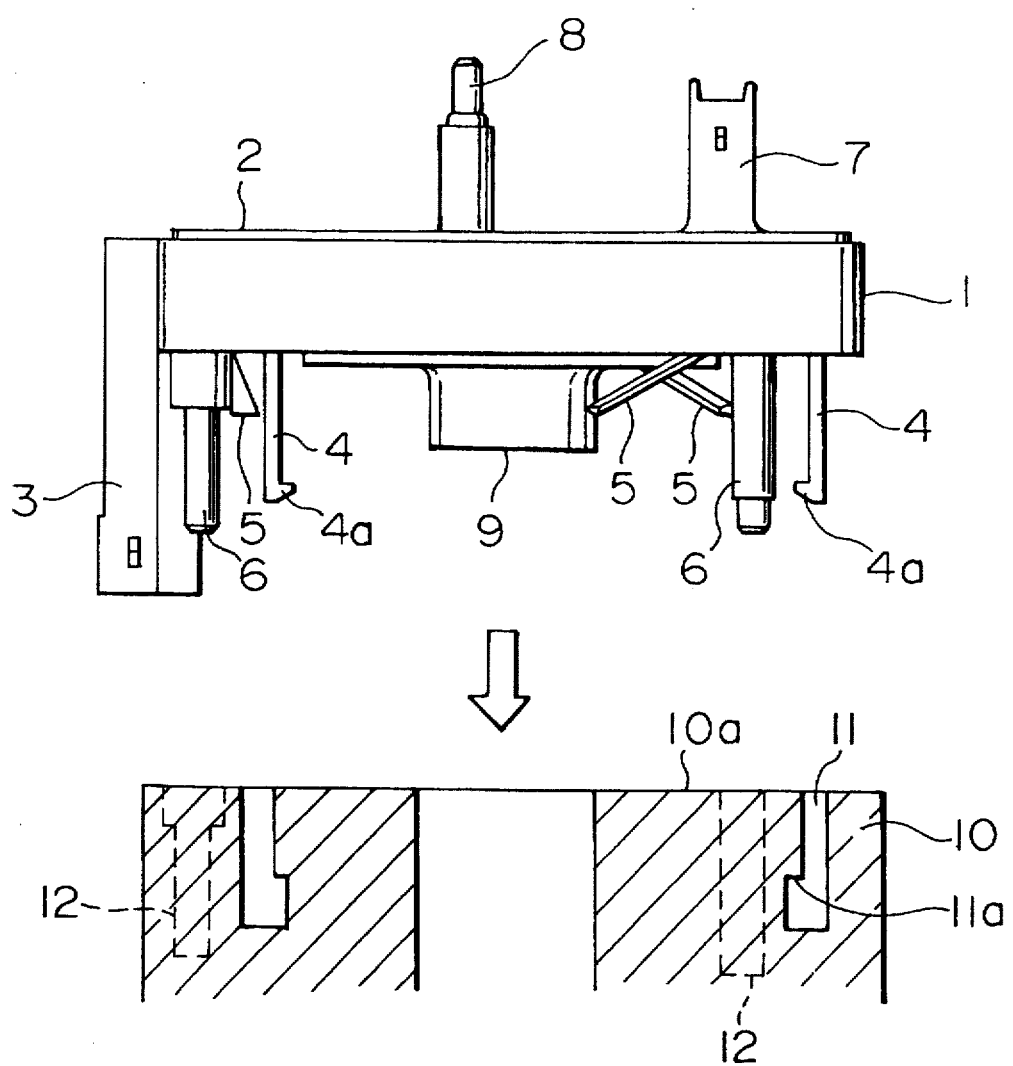
FIG. 1 is a diagram illustrating a ratary connector and a stator member.

An embodiment of the present invention will now be described with reference to the drawings. As shown in FIG. 1, the rotary connector comprises a first housing 1, which constitutes the stationary housing, a second housing 2, which constitutes the movable housing, and a flexible cable (not shown) which is accommodated and wound inside these housings 1 and 2.

Figure 2:
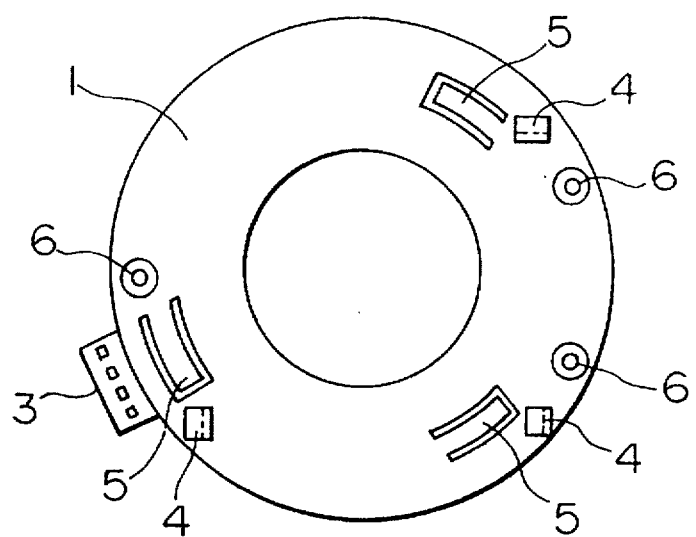
FIG. 2 is a bottom view of the rotary connector shown in FIG. 1.

The first housing 1 is formed of synthetic resin. On its outer peripheral surface, a stationary-side direct connector 3 is integrally formed, and, on its bottom surface, mounting members 4 each having a claw portion 4a at its lower end, elastic members 5 extending obliquely downwards, and detent pins 6 are integrally formed. As shown in FIG. 2, three elastic members 5 are formed at intervals of approximately 180°, with the mounting members 4 and the detent pins 6 being formed in the vicinity of the elastic members 5. In this embodiment, three elastic members 5, which function as displacement absorbing members, are preferably arranged at approximately the same intervals. However, the number of the elastic members is not restricted to three.

The second housing 2 is also formed of synthetic resin. On its top surface, a movable-side direct connector 7 and a drive pin 8 are integrally formed. The second housing 2 has at its center an inner cylindrical portion 9, and the first housing 1 and the second housing 2 are rotatably connected to each other, with a part of the inner cylindrical portion 9 protruding from the bottom surface of the first housing 1. The above-mentioned flexible cable is spirally wound inside the annular accommodating section defined between the housings 1 and 2. One end of the flexible cable is led to the stationary-side direct connector 3, and the other end thereof is led to the movable-side direct connector 7.

Figure 3A:
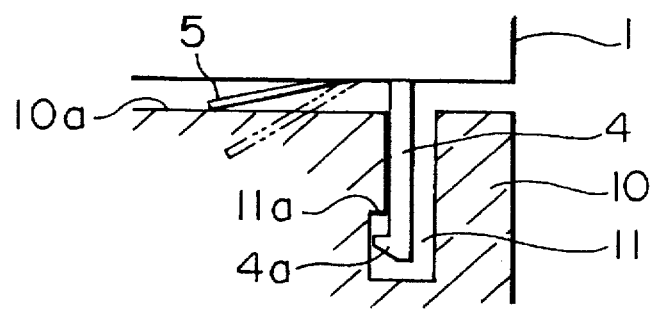
FIGS. 3A and 3B are diagrams illustrating how the rotary connector shown in FIG. 1 is mounted.
Figure 3B:
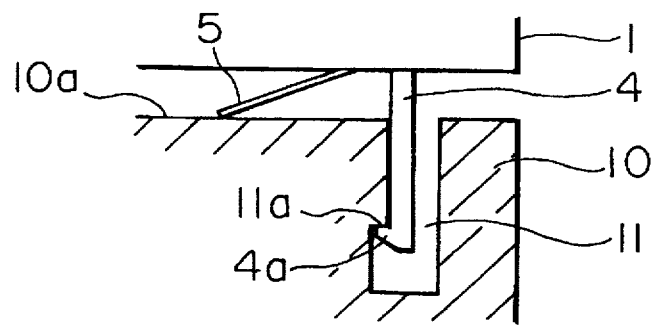

The first, stationary housing 1 is mounted to a switching casing 10 of a combination switch, which is the stator member of a steering device, and the steering wheel is engaged with the drive pin 8 of the second housing 2, whereby the rotary connector, constructed as described above, is used as connecting means for an air bag inflator, a horn switch, etc. attached to the steering wheel. When mounting the first housing 1 to the switch casing 10, the mounting members 4 of the first housing 1 are inserted into corresponding engagement holes 11 of the switch casing 10, and the detent pins 6 are inserted into corresponding positioning holes 12 of the switch casing 10. After the lower ends of the elastic members 5 have abutted a mounting surface 10a of the switch casing 10, the first housing 1 is further pushed in against the resilient force of the elastic members 5, with the result that, as shown in FIG. 3A, the claw portions 4a of the mounting members 4 pass step portions 11a formed inside the engagement holes 11, thereby causing the claw portions 4a to be reliably snapped in below the step portions 11a. After this, the pressurizing force which has been applied to the first housing 1 is cancelled, with the result that, as shown in FIG. 3B, the first housing is raised by the resilient force of the elastic members 5, whereby the claw portions 4a of the mounting members 4 are engaged with the corresponding step portions 11a. As a result, the movement in the rotating direction of the first housing 1 with respect to the switch casing 10 is restricted by the detent pins 6, and the housing is prevented from coming off by the mounting members 4. Further, rattling is prevented by the elastic members 5.

When the steering wheel is rotated clockwise or counterclockwise, the torque is transmitted to the second housing through the drive pin 8, and the second housing 2 is rotated in the same direction. For example, when the steering wheel is rotated counterclockwise from its neutral rotating position, the second housing 2 also rotates counterclockwise with that, and the flexible cable is wound and tightened around the inner cylindrical portion 9 of the second housing. On the other hand, when the steering wheel is rotated clockwise from its neutral rotating position, the second housing 2 also rotates clockwise, and the flexible cable is re-wound and restored to the outer cylindrical portion side of the first housing 1. In either case, the electrical connection between the housings 1 and 2 is maintained through the flexible cable.

Figure 4:
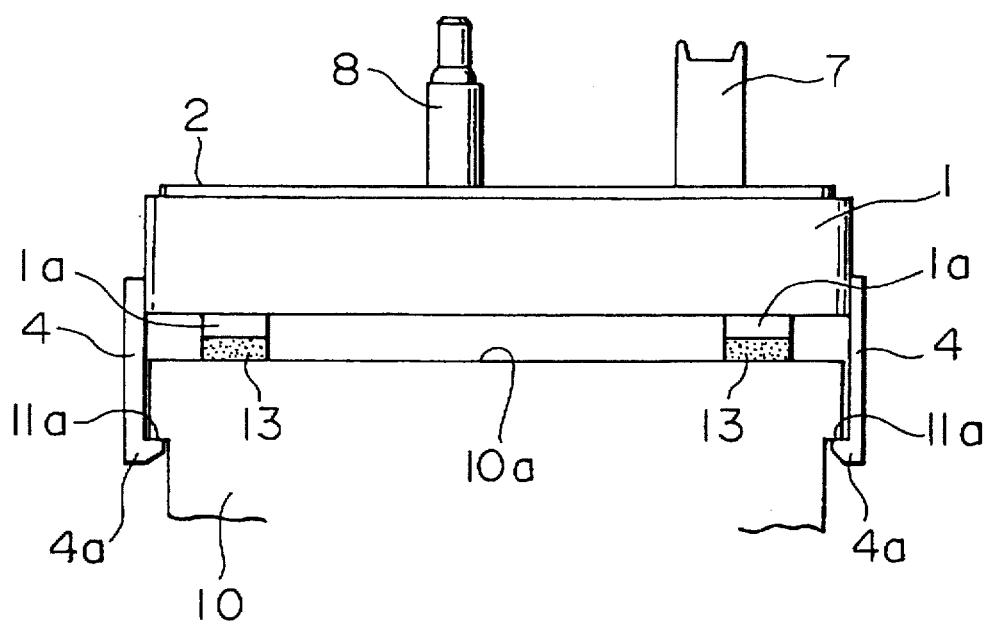
FIG. 4 is a front view showing how the rotary connector and the stator member are mounted.

In the embodiment shown in FIG. 4, a protrusion 1a is integrally formed on the bottom surface of the first housing 1, and a cushion member 13 consisting of urethane foam or the like is glued to this protrusion 1a. This cushion member 13 functions as a displacement absorbing member, and is formed, for example, as a ring. In this case, when the first housing 1 is mounted to the switch casing 10, the cushion member 13 abuts the mounting surface 10a of the switch casing 10 and is thereby compressed, whereby the claw portions 4a of the mounting members 4 can be reliably snapped in on the step portions 11a of the switch casing 10. After the first housing 1 has been mounted, the cushion member 13 expands, and biases the bottom surface of the first housing 1 and the mounting surface 10a of the switch casing 10 such that they move away from each other, whereby rattling of the first housing 1 can be prevented.

Figure 5:
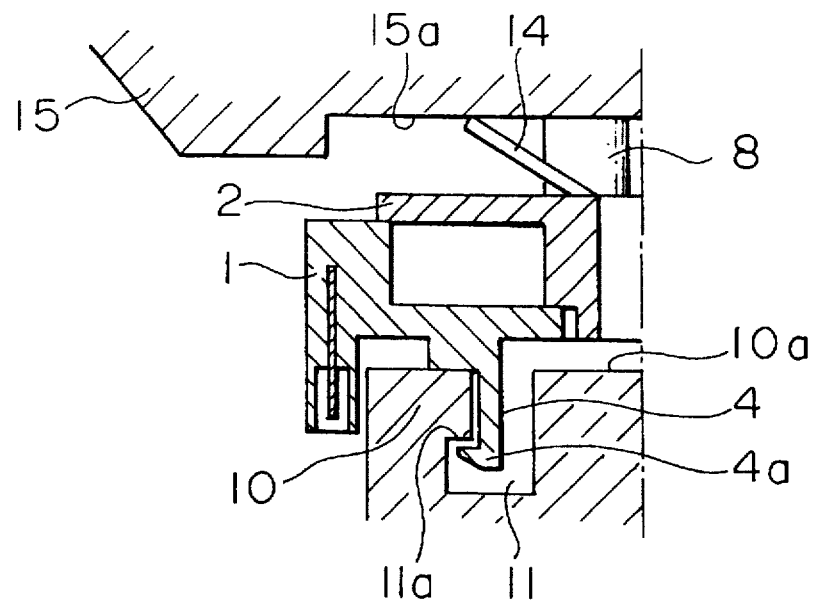
FIG. 5 is a partial sectional view illustrating how the rotary connector is mounted.

In the embodiment shown in FIG. 5, the displacement absorbing member is provided not on the first, stationary housing 1, but on the second, movable housing 2. For example, an elastic member 14 is integrally formed on the top surface of the second housing 2, and this elastic member 14 is in press contact with a mounting surface 15a of a steering wheel 15, which is the rotor member of a steering device. In this case, in the condition in which the claw portions 4a of the mounting members 4 have been snapped in on the step portions 11a of the switch casing 10, a snapping play is generated between the first housing 1 and the switch casing 10. However, after the steering wheel 15 has been engaged with the drive pin 8 of the second housing 2, the elastic member 14 biases the top surface of the second housing 2 and the mounting surface 15a of the steering wheel 15 such that they move away from each other, and, due to this biasing force, the first housing 1 is pressed against the mounting surface 10a of the switch casing 10, whereby rattling of the rotary connector can be prevented.

Figure 6:
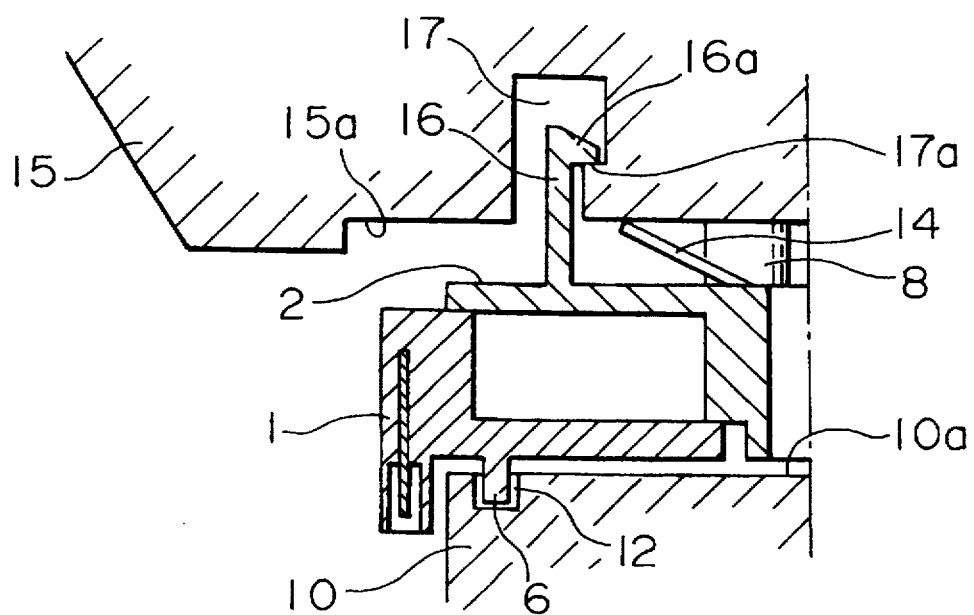
FIG. 6 is a partial sectional view illustrating how the rotary connector is mounted.

In the embodiment shown in FIG. 6, the second, movable housing 2 and the steering wheel 15 are snap-fixed to each other, and a displacement absorbing member is provided between the second housing 2 and the steering wheel 15. For example, an elastic member 14 is integrally formed on the top surface of the second housing 2, and a mounting member 16 for snapping engagement is provided, with an engagement hole 17 being formed in the steering wheel 15, which is the rotor member of the steering device. In this case, when the second, movable housing 2 is mounted to the steering wheel 15 after the first, stationary housing 1 is engaged with the switch casing 10 by means of the detent pins 6, the elastic member 14 abuts the mounting surface 15a of the steering wheel 15 to be thereby deformed, whereby the claw portion 16a of the mounting member 16 can be reliably snapped in on the step portion 17a in the engagement hole 17. After the mounting of the second housing 2, the elastic member 14 biases the top surface of the second housing 2 and the mounting surface 15a of the steering wheel 15 such that they move away from each other, and, due to this biasing force, the first housing 1 is pressed against the mounting surface 10a of the switch casing 10, whereby rattling of the rotary connector can be prevented. While in this example the first housing 1 is engaged with the switch casing 10 solely by the detent pins 6, it is also possible to snap-fix them to each other by utilizing a mounting member provided on the first housing 1 or the switch casing 10.

The present invention, embodiments of which have been described above, provides the following advantages:

At least one of the stationary housing and the movable housing of the rotary connector is snap-fixed to the stator member or the rotor member of a steering device by a mounting member, and a displacement absorbing member for preventing rattling of this mounting member is provided, whereby, when the rotary connector is snap-fixed to the steering device, the displacement absorbing member is deformed when snap-fixing the rotary connector to the steering member, thereby making it possible for the mounting member to be reliably snapped in. After the mounting, the displacement absorbing member is resiliently restored to the former state, and biases the rotary connector and the mounting surface of the steering device such that they move away from each other, thereby preventing the rotary connector from rattling. Thus, it is possible to provide a rotary connector mounting structure which prevents the rotary connector from rattling after the mounting and helps to achieve a reduction in noise without impairing the advantage of the snap-in system, which allows the rotary connector to be easily mounted.

Further, when an elastic member which is integrally formed on the bottom surface of the stationary housing or the top surface of the movable housing is used as a displacement absorbing member, there is no increase in the number of parts, thereby preventing an increase in cost.

Further, when a cushion member which is attached to the bottom surface of the stationary housing or the top surface of the movable housing is used as a displacement absorbing member, the range of selection for the material of the cushion material expands, thereby making it possible to achieve an improvement in terms of degree of freedom in designing.

What is claimed is:

1. A rotary connector mounting structure comprising:
a stationary horsing, a movable housing rotatably connected to the stationary housing, and a flexible cable wound inside an accommodating section defined between these housings, the stationary housing being mounted to a stator member of an automobile, the movable housing being mounted to a rotor member of the automobile, wherein there is provided a mounting member for snap-fixing the stationary housing to the stator member, and wherein there is provided a displacement absorbing member for preventing said mounting member from rattling.

2. The rotary connector mounting structure of claim 1, wherein said mounting member is formed on the bottom surface of said stationary housing.

3. The rotary connector mounting structure of claim 1, wherein said mounting member is formed on said stator member.

4. The rotary connector mounting structure of claim 1, wherein said displacement absorbing member is an elastic member.

5. The rotary connector mounting structure of claim 1, wherein said displacement absorbing member is a cushion member.

6. The rotary connector mounting structure of claim 1, wherein said displacement absorbing member is formed on the bottom surface of said stationary housing.

7. The rotary connector mounting structure of claim 1, wherein said displacement absorbing member is formed on said stator member.

8. The rotary connector mounting structure of claim 1, wherein said displacement absorbing member is formed on the top surface of said movable housing.

9. The rotary connector mounting structure of claim 1, wherein said displacement absorbing member is formed on said rotor member.

10. A rotary connector mounting structure comprising:
a stationary housing, a movable housing rotatably connected to the stationary housing, and a flexible cable wound inside an accommodating section defined between these housings, the stationary housing being mounted to a stator member of an automobile, the movable housing being mounted to a rotor member of the automobile, wherein there is provided a mounting member for snap-fixing the movable housing to the rotor member, and wherein there is provided a displacement absorbing member for preventing said mounting member from rattling.

11. The rotary connector mounting structure of claim 10, wherein said mounting member is formed on the top surface of said movable housing.

12. The rotary connector mounting structure of claim 10, wherein said mounting member is formed on said rotor member.

13. The rotary connector mounting structure of claim 10, wherein said displacement absorbing member is an elastic member.

14. The rotary connector mounting structure of claim 10, wherein said displacement absorbing member is a cushion member.

15. The rotary connector mounting structure of claim 10, wherein said displacement absorbing member is formed on the top surface of said movable housing.

16. The rotary connector mounting structure of claim 10, wherein said displacement absorbing member is formed on said rotor member.

17. The rotary connector mounting structure of claim 10, wherein said displacement absorbing member is formed on the bottom surface of said stationary housing.

18. The rotary connector mounting structure of claim 10, wherein said displacement absorbing member is formed on said stator member.

19. A rotary connector mounting structure comprising:

a stationary housing, a movable housing rotatably connected to the stationary housing, and a flexible cable wound inside an accommodating section defined between these housings, the stationary housing being mounted to a stator member of an automobile, the movable housing being mounted to a rotor member of the automobile, wherein a mounting member for snap-fixing the stationary housing to the stator member is formed on said stationary housing, and wherein there is provided a displacement absorbing member between said stationary housing and said stator member for preventing said mounting member from ratting.

20. The rotary connector mounting structure of claim 19, wherein said displacement absorbing member is an elastic member.

* * * * *

UNITED STATES PATENT AND TRADEMARK OFFICE
CERTIFICATE OF CORRECTION

PATENT NO. : 5,800,191
DATED : September 1, 1998
INVENTOR(S) : Yoshiro Honda et al.

It is certified that error appears in the above-indentified patent and that said Letters Patent is hereby corrected as shown below:

In the Claims

In Claim 1, line 1, replace "horsing" with --housing--.

In Claim 1, line 11, after "member" insert --that provides a resilient bias--.

In Claim 10, line 11, after "member" insert --that provides a resilient bias--.

In Claim 19, line 12, after "member" insert --that provides a resilient bias--.

In Claim 19, line 13, replace "ratting" with --rattling--.

Signed and Sealed this

Fifteenth Day of February, 2000

Attest:

Q. TODD DICKINSON

Attesting Officer        Commissioner of Patents and Trademarks